Patented Dec. 5, 1950

2,533,087

UNITED STATES PATENT OFFICE 2,533,087

THIANAPHTHENYLMETHYL BENZOATE

Frederick F. Blicke, Washtenaw County, Mich., assignor to Regents of the University of Michigan, Ann Arbor, Mich., a corporation of Michigan No Drawing. Application November 19, 1949, Serial No. 128,488

8 Claims. (Cl. 260—330)

This invention relates to 2-thianaphthenylmethyl benzoate and 3-thianaphthenylmethyl benzoate and their method of preparation.

2-thianaphthenylmethyl benzoate and 3-thianaphthenylmethyl benzoate having the following respective formulas

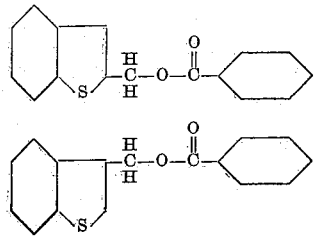

have been found to possess exceptional utility as selective solvents and pharmaceuticals.

2-thianaphthenylmethyl benzoate and 3-thianaphthenylmethyl benzoate may be conveniently prepared by reacting the corresponding chloromethyl substituted thianaphthene with an alkali metal benzoate. The reaction is preferably carried out by reacting approximately equimolecular proportions of the above described reactants in the presence of a suitable catalyst, such as organic amines of which triethylamine and N,N-dimethyl-cyclohexylamine are particular examples. In the absence of a catalyst the reaction necessarily proceeds slower, but if desired, the reaction may be carried out in this manner. The reaction is preferably carried out at an elevated temperature in the range of from about 90° C. to about 150° C. Chloromethylthianaphthenes may be prepared as follows:

2-chloromethylthianaphthene

A mixture containing 32.8 parts by weight of 2-hydroxymethylthianaphthene and 29.7 parts by weight of thionyl chloride was boiled under reflux conditions for 1½ hours. The reaction mixture was then fractionally distilled under reduced pressure, thereby obtaining 29.0 parts by weight of 2-chloromethylthianaphthene, representing a yield of 79.4% based on 2-hydroxymethylthianaphthene. The 2-chloromethylthianaphthene had the following properties:

Boiling point, 124–126° C. at 2 mm. Hg absolute
Melting point, 55–56° C.

3-chloromethylthianaphthene

A rapid stream of hydrogen chloride was passed into a vigorously stirred mixture containing 97 parts by weight of 35% aqueous formaldehyde, 110 parts by weight of concentrated hydrochloric acid and 130.5 parts by weight of thianaphthene until the mixture was saturated. During this time, the temperature of the mixture rose to 65° C. This temperature was maintained for one hour while a slow stream of hydrogen chloride was passed into the mixture. Water was added to the cold material, the organic layer separated, and the aqueous layer extracted with benzene. The combined organic layer and benzene extract was washed successively with water, sodium bicarbonate solution and water. Upon fractionation there was obtained 101.2 parts by weight of 3-chloromethylthianaphthene, representing a yield of 74.5% based on the thianaphthene which had reacted. The 3-chloromethylthianaphthene thus obtained had the following property:

Boiling point, 125°–127° C. at 2 mm. Hg absolute

The novel compounds of this invention may also be prepared by reacting the correspondingly substituted hydroxymethylthianaphthene with benzoyl chloride, preferably in approximately equimolecular proportions, in a suitable solvent, such as pyridine. This reaction is preferably carried out at a temperature in the range of from about 20° C. to about 100° C. Hydroxymethyl substituted thianaphthenes and their method of preparation are described and claimed in my copending application, Serial No. 128,485, filed November 19, 1949. The following examples are illustrative of the method of preparation of hydroxymethylthianaphthenes:

2-hydroxymethylthianaphthene

A solution of 11.4 g. of lithium aluminum hydride in 700 ml. of anhydrous ether was prepared in a liter flask to which a Soxhlet extractor was attached. 35.6 g. of thianaphthene-2-carboxylic acid was placed in the extractor thimble and the ether boiled under reflux conditions for 24 hours. After careful addition of water, 30 ml. of concentrated sulfuric acid in 300 ml. of water was added to the mixture. The layers that formed were separated, and the water layer extracted with ether. The combined ether solutions were washed successively with water, sodium bicarbonate solution and water, dried over anhydrous magnesium sulfate and then fractionally distilled to obtain 2-hydroxymethylthianaphthene. The 2-hydroxymethylthianaphthene thus obtained, after recrystallization from petroleum ether, had the following physical properties:

Boiling point, 123–125° C. at 1.5 mm. Hg absolute
Melting point, 99–100° C.

3-hydroxymethylthianaphthene

A suspension of 8.9 g. of thianaphthene-3-carboxylic acid in 200 ml. of anhydrous ether was dropped slowly into a boiling solution of 2.7 g. of lithium aluminum hydride in 200 ml. of dry ether during a period of ½ hour. The mixture was cooled, and after the careful addition of water, was treated with a solution of 10 ml. of concentrated sulfuric acid in 100 ml. of water. The reaction mixture separated into two layers. The water layer was extracted with ether. This ether extract was combined with the ether layer of the reaction mixture and the combined ether solutions washed with water, dried, and the ether removed by distillation. From the residue, there was obtained 7.9 g. of 3-hydroxymethylthianaphthene, having the following property:

Boiling point, 124–125° C. at 1.5 mm. Hg absolute

The following examples are illustrative of the manner in which the novel compounds of this invention may be prepared:

2-thianaphthenylmethyl benzoate

A mixture of 9.1 parts by weight of 2-chloromethylthianaphthene, 7.2 parts by weight of sodium benzoate and 0.2 part by weight of triethylamine was heated at 95–105° C. for 3½ hours. The mixture was cooled, and stirred with a mixture of ether and water, whereby a product containing an ether layer and an aqueous layer was obtained. The water layer was separated and extracted with ether. The two ether layers were combined, washed with water, dried over anhydrous sodium sulfate, and fractionally distilled. 2-thianaphthenylmethyl benzoate thus obtained was recrystallized from ethanol, and a 90% yield of 2-thianaphthenylmethyl benzoate recovered having the following properties:

Boiling point, 158–160° C. at .02 mm. Hg absolute
Melting point, 70–71° C.
Analysis:
    Calculated for $C_{16}H_{12}O_2S$, 11.95% S
    Found, 11.71% S

3-thianaphthenylmethyl benzoate

A mixture of 9.1 parts by weight of 3-chloromethylthianaphthene, 7.2 parts by weight of sodium benzoate and 0.2 part of triethylamine was heated at about 100° C. for about 4 hours. The mixture was cooled, and stirred with a mixture of ether and water, whereby a product containing an ether layer and an aqueous layer was obtained. The water layer was separated and extracted with ether. The two ether layers were combined, washed with water, dried over anhydrous magnesium sulfate and fractionally distilled. 3-thianaphthenylmethyl benzoate thus obtained was recrystallized from ethanol and a 96% yield of 3-thianaphthenylmethyl benzoate recovered having the following properties:

Boiling point, 156–158° C. at .02 mm. Hg absolute
Melting point, 92–93° C.
Analysis:
    Calculated for $C_{16}H_{12}O_2S$, 11.95% S
    Found, 11.94% S

What is claimed is:

1. As new compositions of matter, thianaphthenylmethyl benzoates selected from the group consisting of 2-thianaphthenylmethyl benzoate and 3-thianaphthenylmethyl benzoate.

2. 2-thianaphthenylmethyl benzoate.

3. 3-thianaphthenylmethyl benzoate.

4. A process for the preparation of a thianaphthenylmethyl benzoate selected from the group consisting of 2-thianaphthenylmethyl benzoate and 3-thianaphthenylmethyl benzoate which comprises reacting a chloromethylthianaphthene selected from the group consisting of 2-chloromethylthianaphthene and 3-chloromethylthianaphthene with an alkali metal benzoate.

5. A process for the preparation of a thianaphthenylmethyl benzoate selected from the group consisting of 2-thianaphthenylmethyl benzoate and 3-thianaphthenylmethyl benzoate which comprises reacting a 1 molecular proportion of a chloromethylthianaphthene selected from the group consisting of 2-chloromethylthianaphthene and 3-chloromethylthianaphthene with approximately a 1 molecular proportion of an alkali metal benzoate, at a temperature in the range of from about 90° C. to about 150° C., and recovering said thianaphthenylmethyl benzoate.

6. A process for the preparation of a thianaphthenylmethyl benzoate selected from the group consisting of 2-thianaphthenylmethyl benzoate and 3-thianaphthenylmethyl benzoate which comprises reacting a 1 molecular proportion of a chloromethylthianaphthene selected from the group consisting of 2-chloromethylthianaphthene and 3-chloromethylthianaphthene with approximately a 1 molecular proportion of an alkali metal benzoate in the presence of an organic amine catalyst, and while maintaining a temperature in the range of from about 90° C. to about 150° C., and recovering said thianaphthenylmethyl benzoate.

7. The process as described in claim 6 wherein the chloromethylthianaphthene is 2-chloromethylthianaphthene.

8. The process as described in claim 6 wherein the chloromethylthianaphthene is 3-chloromethylthianaphthene.

FREDERICK F. BLICKE.

No references cited.